(12) United States Patent
Miller

(10) Patent No.: US 6,529,651 B1
(45) Date of Patent: Mar. 4, 2003

(54) METHOD AND APPARATUS FOR OPTICAL SWITCHING

(75) Inventor: Robert O. Miller, Carrollton, TX (US)

(73) Assignee: Optical Switch Corporation, Richardson, TX (US)

( * ) Notice: Subject to any disclaimer, the term of this patent is extended or adjusted under 35 U.S.C. 154(b) by 46 days.

(21) Appl. No.: 09/844,333

(22) Filed: Apr. 26, 2001

(51) Int. Cl.⁷ ................................................ G02B 6/26
(52) U.S. Cl. .......................... 385/15; 385/16; 385/20; 385/21; 385/27
(58) Field of Search .......................... 385/15, 16, 17, 385/20, 21, 22, 6, 25, 27, 31

(56) References Cited

U.S. PATENT DOCUMENTS

| | | | |
|---|---|---|---|
| 3,776,176 A | 12/1973 | Doyle | 385/147 X |
| 4,057,719 A | 11/1977 | Lewis | 385/15 X |
| 4,189,206 A | 2/1980 | Terai et al. | 385/15 X |
| 4,342,973 A | 8/1982 | Stone et al. | 335/2 |
| 4,512,627 A | 4/1985 | Archer et al. | 385/15 X |
| 4,582,391 A | 4/1986 | Legrand | 385/15 X |
| 4,688,885 A | 8/1987 | Poteat et al. | 385/15 X |
| 4,778,254 A | 10/1988 | Gilliland, III et al. | 355/71 X |
| 4,796,966 A | 1/1989 | Kovaleski et al. | 385/15 X |
| 4,854,660 A | 8/1989 | Gutterman et al. | 385/15 X |
| 4,896,935 A * | 1/1990 | Lee | 385/22 |
| 4,948,223 A | 8/1990 | Anderson et al. | 385/15 X |
| 4,989,946 A | 2/1991 | Williams et al. | 385/15 X |
| 5,035,482 A | 7/1991 | ten Berge et al. | 385/15 X |
| 5,098,207 A * | 3/1992 | Blomgren | 385/16 |
| 5,239,599 A | 8/1993 | Harman | 385/16 |
| 5,241,610 A | 8/1993 | Labiche et al. | 385/16 |
| 5,261,015 A | 11/1993 | Glasheen | 385/23 |

(List continued on next page.)

OTHER PUBLICATIONS

Lagorce, et al., "Magnetic and Mechanical Properties of Micromachined Strontium Ferrite/Polyimide Composites", IEEE Journal of Microelectromechanical Systems, vol. 6, No. 4, Dec. 1997, pp. 307–312.

Taylor, et al., "Fully Integrated Magnetically Actuated Micromachined Relays", IEEE Journal of Microelectromechanical Systems, vol. 7. No. 2, Jun. 1998, pp. 181–190.

Lagorce, et al., "Magnetic Microactuators Based on Polymer Magnets", IEEE Journal of Microelectromechanical Systems, vol. 8, No. 1, Mar. 1999, pp. 2–8.

Lagorce, et al., "Micromachined Polymer Magnets", pp. 1–2. (No Date of Publication).

Ahn, et al., "A Fully Integrated Surface Micromachined Magnetic Microactuator with a Multilevel Meander Magnetic Core", IEEE Journal of Microelectromechanical Systems, vol. 2, No. 1, Mar. 1993, pp. 15–22.

Primary Examiner—Brian Healy
(74) Attorney, Agent, or Firm—Baker Botts L.L.P.

(57) ABSTRACT

An apparatus (10) includes an optical switch (11) and a control circuit (12). The optical switch includes a member (16) which supports optical fibers (67, 68). A sliding piece (14) is movably supported on the member and also supports optical fibers (66). Movement of the sliding piece is effected by two magnetic field generators (19,49) respectively supported by the member and sliding piece, the direction of movement being controlled by varying the direction of a current flow to one of the generators, while maintaining an unchanging current flow to the other. Each generator includes a plurality of ferromagnetic poles (21, 55), and a serpentine electrical conductor (20, 50). In one operational position of the sliding piece, optical radiation follows a first optical path (87,88) through one pair of the fibers. In a different operational position, optical radiation follows a different optical path (87,89) through a different pair of the fibers (82, 83).

19 Claims, 5 Drawing Sheets

U.S. PATENT DOCUMENTS

| | | | |
|---|---|---|---|
| 5,276,762 A | 1/1994 | Hartman et al. | 385/137 |
| 5,434,936 A | 7/1995 | Nagaoka et al. | 385/22 |
| 5,457,765 A | 10/1995 | Suzuki et al. | 385/137 |
| 5,594,820 A | 1/1997 | Garel-Jones et al. | 385/22 |
| 5,606,635 A | 2/1997 | Haake | 385/53 |
| 5,627,924 A | 5/1997 | Jin et al. | 385/16 |
| 5,732,167 A | 3/1998 | Ishiko et al. | 385/12 |
| 5,757,991 A * | 5/1998 | Harman | 385/15 |
| 5,828,800 A | 10/1998 | Henry et al. | 385/20 |
| 6,044,186 A * | 3/2000 | Chang et al. | 385/16 |
| 6,169,826 B1 * | 1/2001 | Nishiyama et al. | 385/16 |

\* cited by examiner

METHOD AND APPARATUS FOR OPTICAL SWITCHING

TECHNICAL FIELD OF THE INVENTION

This invention relates in general to optical switching and, more particularly, to a method and apparatus for effecting movement of a component in an optical switch between two operational positions.

BACKGROUND OF THE INVENTION

Over the past twenty years, fiber optic technology has evolved very rapidly. One aspect of this evolution has been in the area of optical switching. Optical switching systems generally include optical carriers, such as optical fibers, coupled to optical components that receive, transmit, and otherwise process information in optical signals. The switching components in a fiber optic communication system selectively direct the information carried by the optical signal to one or more optical components.

There are a number of desirable characteristics for an optical switch, including low insertion loss, high isolation (low crosstalk), small size, high repeatability, high reliability, low cost, ability to change states very quickly, and ability to change states with minimal energy consumption. The portion of an optical switch which effects actuation of the switch is one area where existing arrangements have been generally adequate for their intended purposes, but have not been entirely satisfactory in all respects. In this regard, existing actuators tend to exhibit one or more of several disadvantages, such as relatively high cost, and the need for a relatively high supply voltage at all times during operation of the switch. In addition, existing actuators, such as piezoelectric actuators, generally use direct actuation that can impose mechanical constraints on the switch.

SUMMARY OF THE INVENTION

From the foregoing, it may be appreciated that a need has arisen for a method and apparatus for optical switching which involves actuation in a manner that avoids some or all of the disadvantages of existing actuators. According to the present invention, a method and apparatus are provided to address this need. In this regard, one form of the present invention includes a first member having a first generator that includes a first pole which can generate a magnetic field, and a second member having a second generator that is adjacent the first generator and that includes a second pole which can generate a magnetic field, the first member being supported for movement relative to the second member between first and second positions. One of the first and second generators includes a polarity control conductor extending adjacent one of the first and second poles therein and the other of the poles in the other of the generators effects generation of a magnetic field of predetermined polarity. When a current is passed in a first direction through the polarity control conductor, the one pole generates a first magnetic field in a manner so that the interaction between magnetic fields generated by the first and second poles causes the first member to be urged toward the first position. When a current is passed through the polarity control conductor in a second direction opposite the first direction, the one pole generates a second magnetic field with a polarity opposite to the first magnetic field, so that the interaction between the magnetic fields generated by the first and second poles causes the first member to be urged toward the second position. A first optical element is coupled to the first member and a second optical element is coupled to the second member. Movement of the first member relative to the second member between the first and second positions effects movement of the first optical element relative to the second optical element respectively between first and second positions. When the first optical element is respectively in the first and second positions thereof, an optical path is respectively established and interrupted, the first and second optical elements each influencing radiation traveling along the optical path when the first and second optical elements are in the first position thereof.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
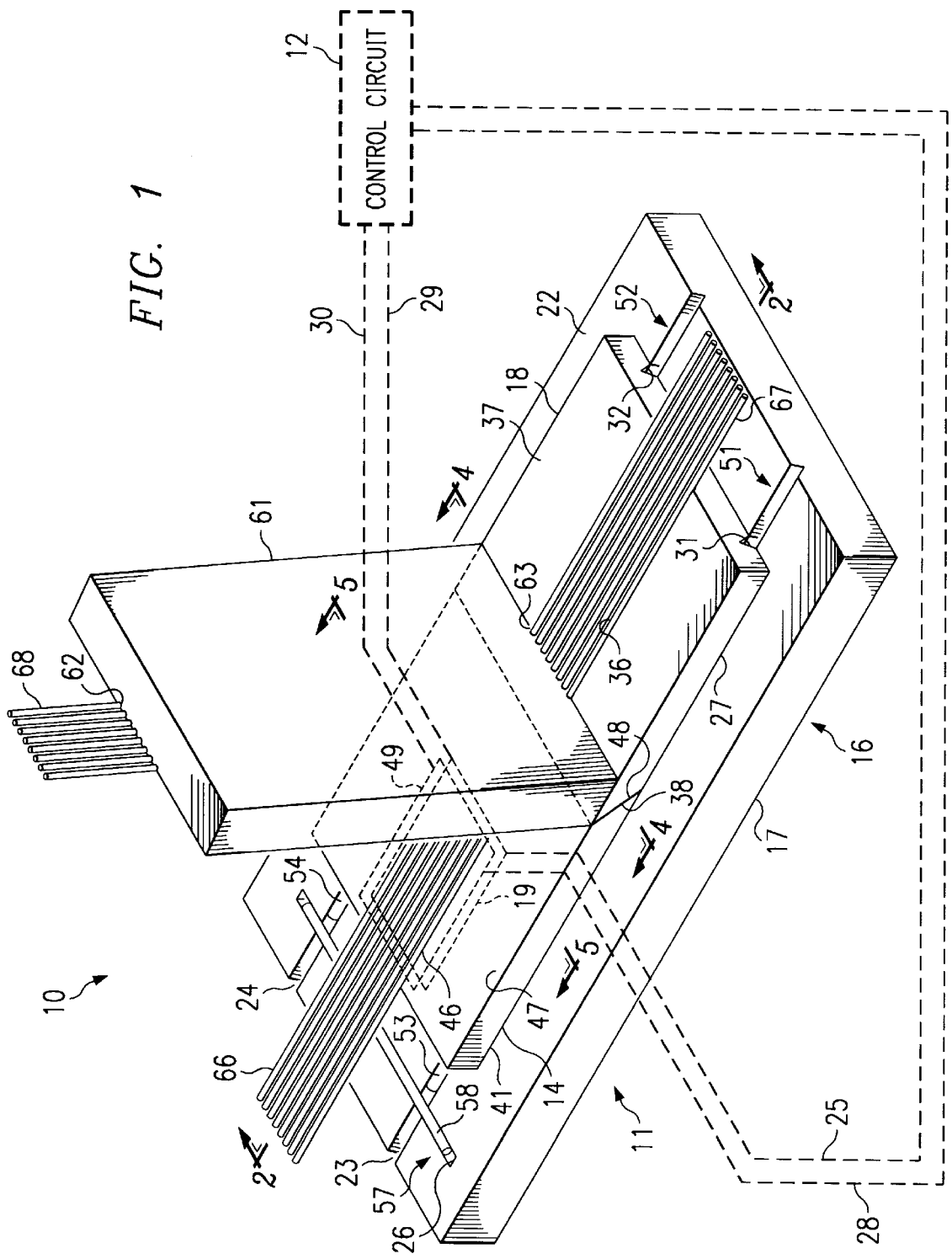
FIG. 1 is a diagrammatic perspective view of an apparatus which embodies the present invention, including an optical switch and a control circuit.

FIG. 1 is a diagrammatic perspective view showing a switching system 10, which includes an optical switch 11 and a control circuit 12 that operates the optical switch 11. Control circuit 12 is capable of applying voltages and quickly reversing polarities, and is a circuit of a type commonly known to persons skilled in the art. The optical switch 11 includes a member 14, hereinafter referred to as a sliding piece. The optical switch 11 also includes a member 16, which includes a base 17 and a fixed piece 18.

The base 17 is made of a silicon semiconductor material. The base 17 includes a top surface 22 having a pair of spaced, parallel V-shaped grooves 23 and 24 that extend the length of the base 17. A further V-shaped groove 26, which is perpendicular to the grooves 23 and 24, is also provided in the top surface 22 of the base 17. The groove 26 intersects the grooves 23 and 24 at an end of the base 17 near the sliding piece 14.

Figure 2:
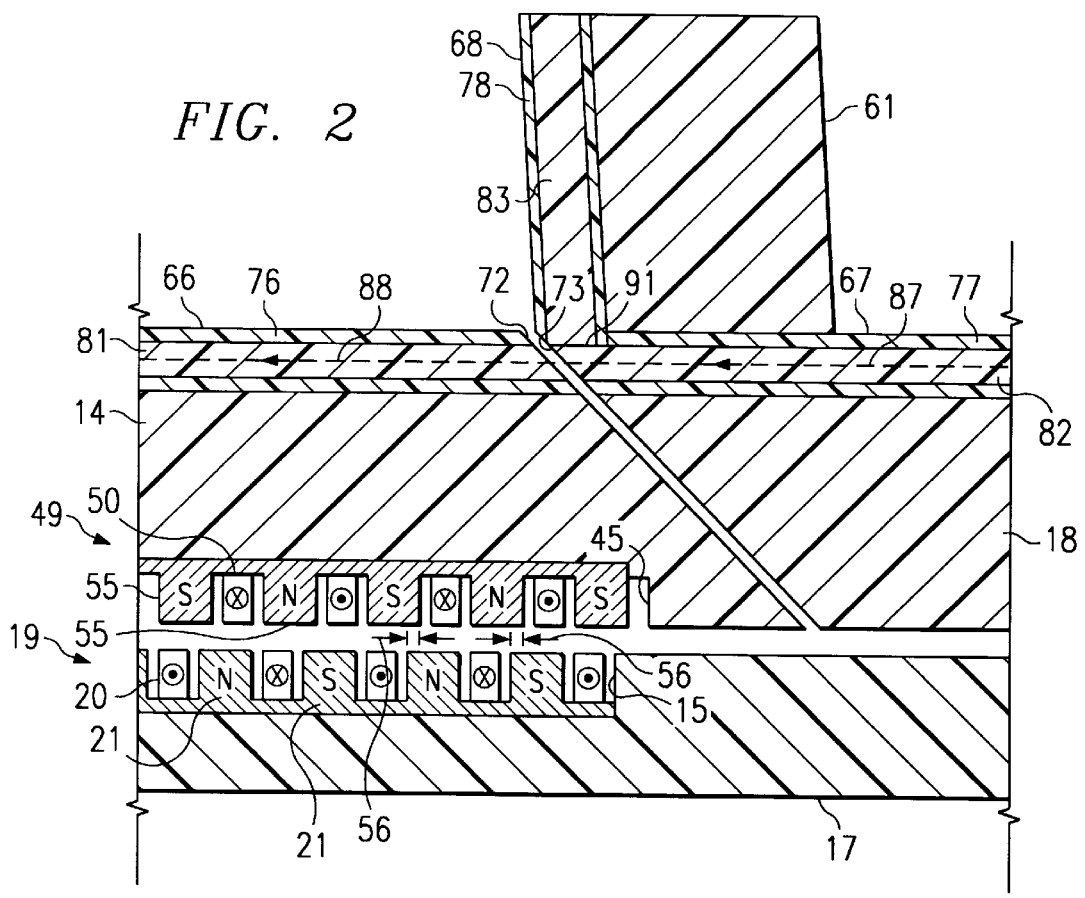
FIG. 2 is a diagrammatic sectional side view of the optical switch of FIG. 1 when a sliding piece thereof is in one operational position, taken along the line 2—2 in FIG. 1.
Figure 3:
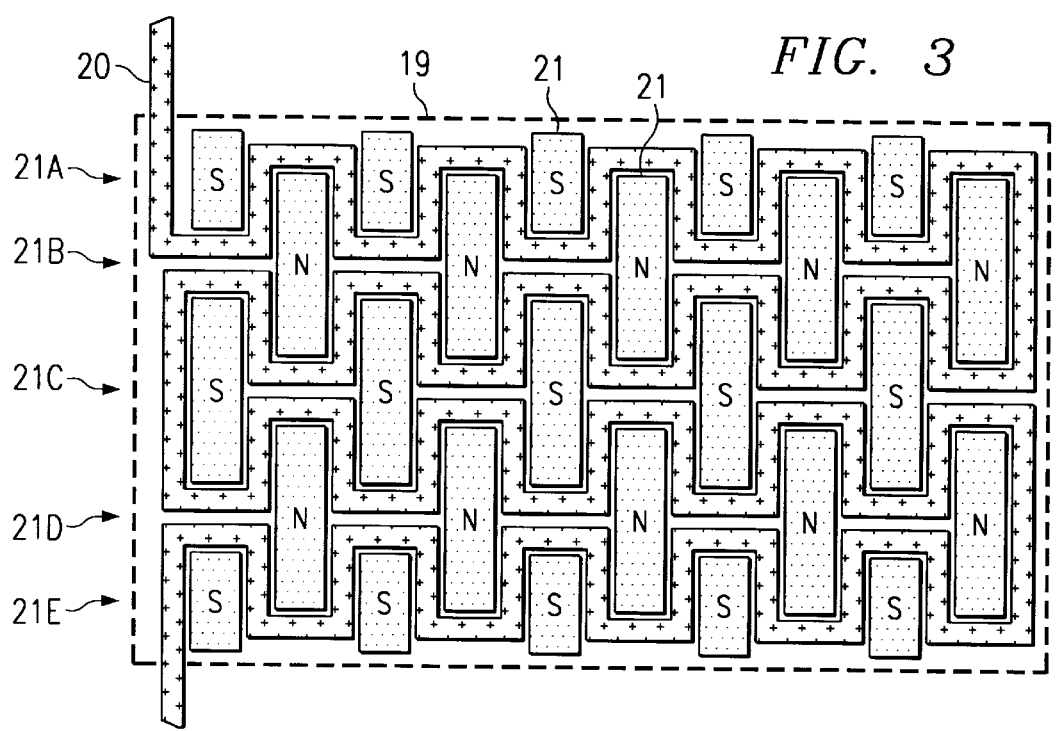
FIG. 3 is a diagrammatic top view of a magnetic field generator which is a component of the optical switch of FIG. 1.

As shown in FIGS. 1 and 2, the base 17 also includes a magnetic field generator 19, which is shown diagrammatically in FIG. 1 as a rectangle in broken lines. Generator 19 is disposed in a recess 15 provided in the side of the base 17 facing the sliding piece 14. The generator 19 is positioned between the parallel grooves 23 and 24 of the base 17. As best seen in FIGS. 2 and 3, the generator 19 includes a plurality of poles 21, and a polarity control conductor 20.

In the disclosed embodiment, the generator 19 is formed using thin film processing techniques. In particular, the poles 21 re made of a ferromagnetic material and are disposed in the recess 15 of the base 17. The ferromagnetic material is a high permeability, low loss core material such as permalloy with $\mu_{96}$ between $10^4$ and $10^5$. The poles 21 are formed by depositing a layer of a ferromagnetic material over the top of the base 17, and then performing a masked etch of that layer which results in a relief pattern of rectangular columns that are the poles 21. The overall layer of ferromagnetic material, including the portions thereof which serve as the poles 21, is referred to as a core. The poles 21 of the core are arranged in an array having five consecutive rows 21A, 21B, 21C, 21D, and 21E. The poles 21 are each generally rectangular in shape, and oriented so that a longest dimension thereof extends transversely to the rows 21A–21E. The poles 21 in the outer rows 21A and 21E are approximately half the length of the poles in the rows 213, 21C, and 21D. The poles in rows 21A, 21C, and 21E are offset in the direction of the rows, relative to the poles in rows 21B and 21D. The generator 19 is, as a whole, oriented so that the longest dimension of each pole 21 is perpendicular to the grooves 23 and 24.

Although FIG. 3 shows five rows and a small number of columns of poles, it will be recognized that the magnetic field generator 19 could have a significantly larger number of rows and/or columns of poles 21. In that event, only the outermost rows would have poles 21 which are half the length of the other poles. It will also be recognized that the poles 21 in the two outermost rows do not have to be half the size of the other poles, but could be the same size.

The polarity control conductor 20 is made from a conductive material such as aluminum, and is disposed in the recess 15 of the base 17. The conductor 20 is formed by depositing a layer of the conductive material over the ferromagnetic core which includes the poles 21. Then, the conductive material is masked and etched to form a particular serpentine pattern, which meanders among the poles 21 in the manner shown in FIG. 3. Instead of aluminum, the polarity control conductor 20 could be made of any suitable electrically conductive material capable of being disposed on a substrate and capable of facilitating a current flow. The two ends of the polarity control conductor 20 are each electrically coupled to the control circuit 12, as shown diagrammatically in FIG. 1 by respective broken lines 25 and 29.

As illustrated in FIG. 3, the polarity control conductor 20 first extends between rows 21A and 21B in a serpentine manner, extending halfway around a pole 21 in row 21A in a counterclockwise direction, then halfway around a pole 21 in row 21B in a clockwise direction, then halfway around the next pole 21 in row 21A in a counterclockwise direction, and so forth. When polarity control conductor 20 reaches the end of row 21A it makes a complete clockwise turn around the perimeter of the last pole in the row 21B, and then extends in a serpentine manner back between rows 21B and 21C. As polarity control conductor 20 extends between rows 21B and 21C, the polarity control conductor 20 makes half turns in opposite directions around successive poles until reaching the end of rows 219 and 21C. At the end of rows 21B and 21C, the polarity control conductor 20 turns and extends between rows 21C and 21D in a similar fashion to that of the routing with respect to rows 21A and 21B. The polarity control conductor 20 then extends in a similar serpentine manner between rows 21D and 21E, until it reaches the beginning of row 21E, where it exits the generator 19. Alternatively, the routing of the polarity control conductor 20 could follow some other pattern that would effect the appropriate magnetic fields generated by the poles 21 when a current is passed through the polarity control conductor 20.

It will be noted that for any given pole 21, each portion of the polarity control conductor 20 near that pole extends past the pole in the same clockwise or counterclockwise direction. In FIG. 3, this direction is counterclockwise for all of the poles 21 in rows 21A, 21C and 21E, and is clockwise for all of the poles 21 in rows 21B and 21D. As a result, the poles in rows 21A, 21C and 21E each generate a magnetic field with a south polarity in response to a current flow in a forward direction through the conductor 20, but generate a north polarity in response to a current flow in the opposite or reverse direction. In contrast, the poles in rows 21B and 21D each generate a magnetic field with a north polarity in response to a current flow in the forward direction through conductor 20, but generate a south polarity in response to a current flow in the reverse direction.

Although the disclosed embodiment shows only one generator 19 on the base 17, it will be recognized that two or more generators could be provided at spaced locations on the base, and could be connected in parallel. This approach could, for example, be used in situations where there was a need to minimize heating within any particular generator.

Figure 4:
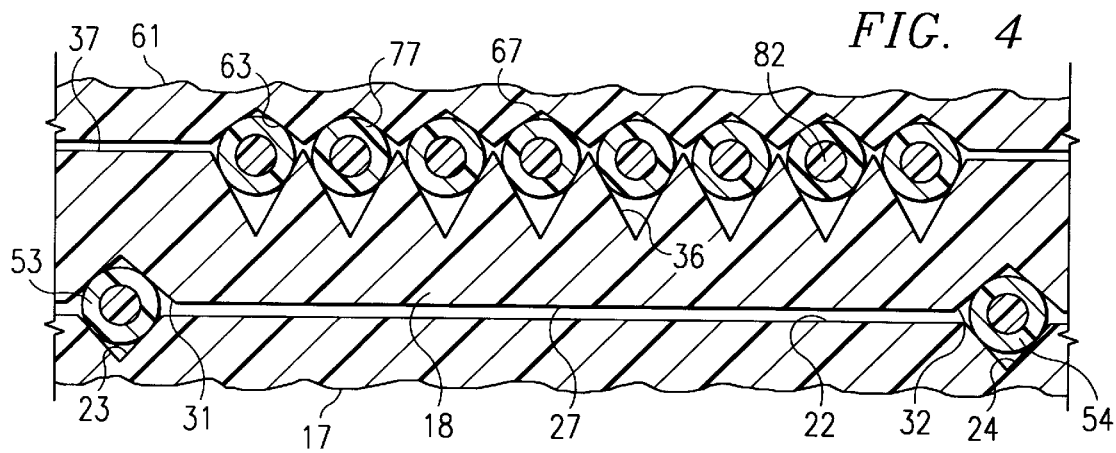
FIG. 4 is a diagrammatic fragmentary sectional view of the optical switch of FIG. 1, taken along the line 4—4 in FIG. 1.

Referring back to FIG. 1, the optical switch 11 further includes the fixed piece 18, which is a generally flat piece. The fixed piece 18 is bonded, using a suitable known adhesive, to the base 17. The fixed piece 18 is made of a silicon semiconductor material. Alternatively, the base 17 and the fixed piece 18 could be respective portions of a single integral part. As shown in FIGS. 1 and 4, the fixed piece 18 includes, in a bottom surface 27, a pair of parallel V-shaped grooves 31 and 32, which are aligned with the grooves 23 and 24 of the base 17, and which extend the length of the fixed piece 18. Eight adjacent V-shaped grooves 36 are provided in the top surface 37 of the fixed piece 18, and extend parallel to the grooves 31–32. The fixed piece 18 has at one end a beveled end surface 38. The end surface extends at an acute angle which is less than 46° with respect to the top surface 37. In the disclosed embodiment, this angle is in the range of 35° to 40°.

Figure 5:
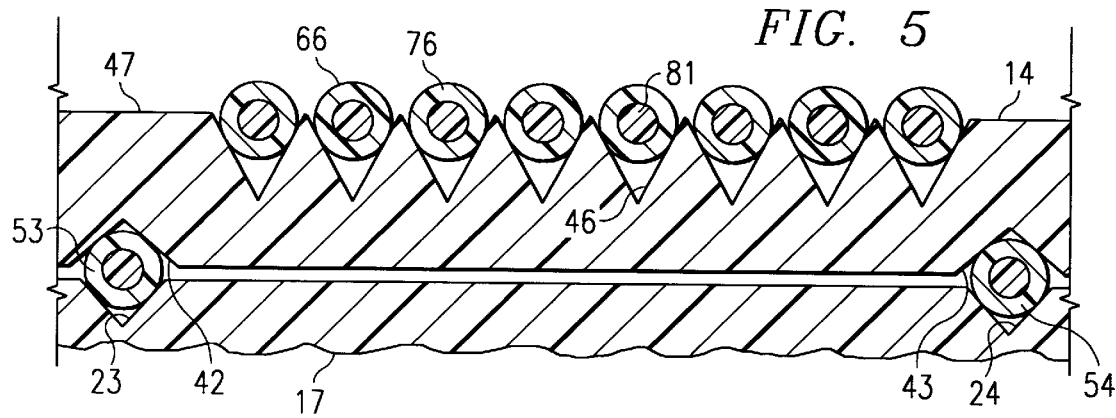
FIG. 5 is a diagrammatic fragmentary sectional view of the optical switch of FIG. 1, taken along the line 5—5 in FIG. 1.

FIG. 1 further illustrates the sliding piece 14, which is generally flat and made of silicon semiconductor material. FIG. 5, which is taken along the line 5—5 in FIG. 1, shows that sliding piece 14 includes, in a bottom surface 41 thereof, a pair of parallel V-shaped grooves 42 and 43. The grooves 42 and 43 are aligned with the grooves 23 and 24 that are included in the base 17. As shown in FIGS. 1 and 5, eight adjacent parallel V-shaped grooves 46 are provided in a top surface 47 of the sliding piece 14. The V-shaped grooves 46 of the sliding piece 14 are aligned with the V-shaped grooves 36 of the fixed piece 18. The sliding piece 14 has at one end a beveled end surface 48. The end surface 48 extends at an acute angle which is less than 46° with respect to the bottom surface 41. In the disclosed embodiment, this acute angle is in the range of 35° to 40°. The beveled end surface 48 of the sliding piece 14 is oriented to extend parallel to the beveled end surface 38 of the fixed piece 18 and, in the advanced position of the sliding piece 14 which is illustrated in FIG. 1, the beveled end surface 48 is disposed adjacent to the beveled end surface 38 of the fixed piece 18, which can include contact between the two surfaces.

Figure 6:
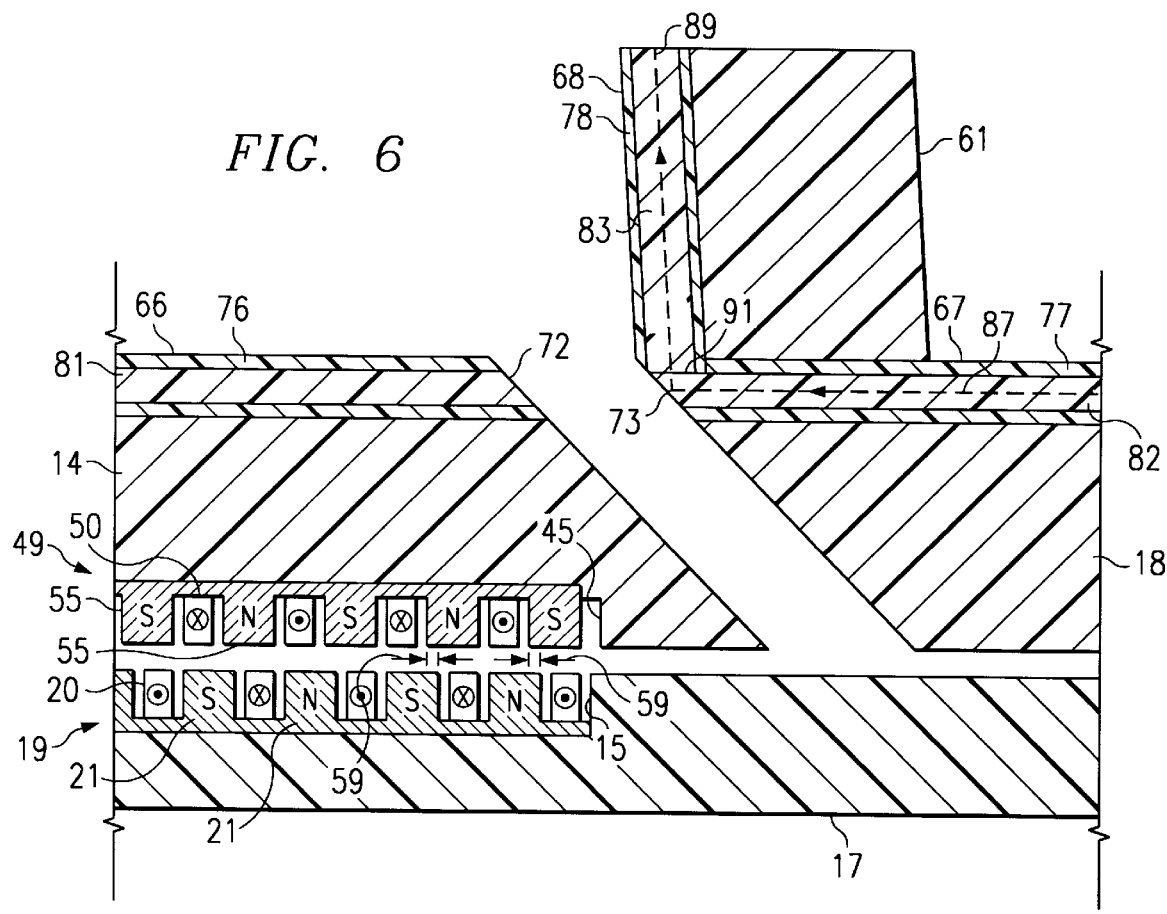
FIG. 6 is a diagrammatic sectional side view similar to FIG. 2, but showing the optical switch with the sliding piece thereof in a different operational position.
Figure 7:
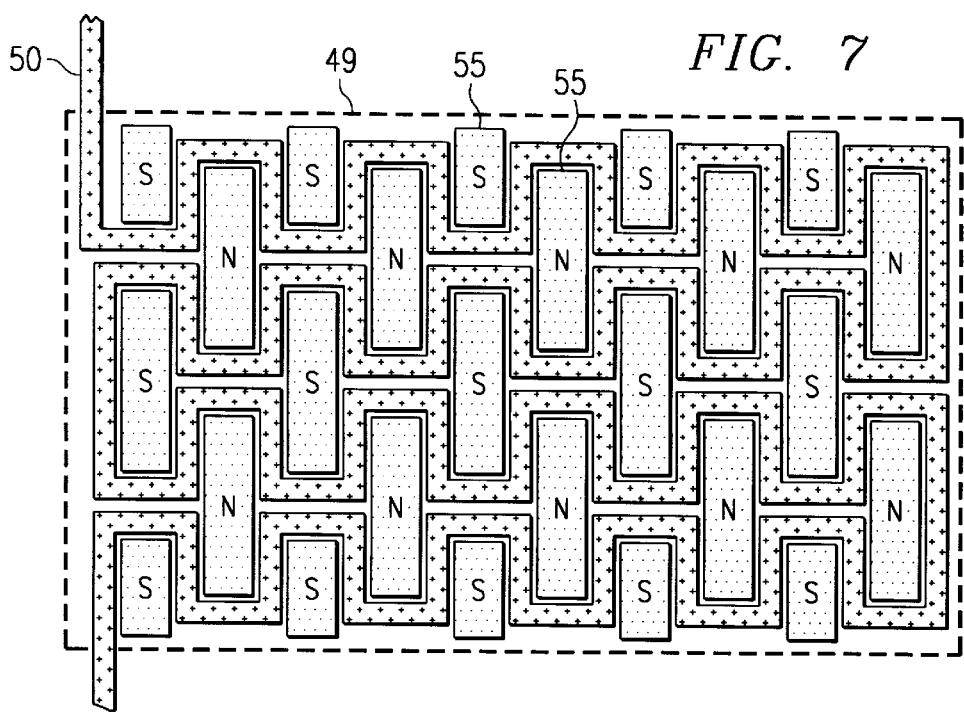
FIG. 7 is a diagrammatic bottom view of a further magnetic field generator which is a component of the optical switch of FIG. 1, and which is similar to the magnetic field generator of FIG. 3.

As illustrated in FIGS. 1 and 6, the sliding piece 14 includes a further magnetic field generator 49, which is shown diagrammatically in FIG. 1 by a rectangle in broken lines. The generator 49 is disposed in a recess 45 provided in the bottom surface of the sliding piece 14, between the parallel grooves 42 and 43. The generator 49 is similar to the generator 19, as evident from FIGS. 6 and 7, and is therefore described here only briefly. The generator 49, as shown in FIGS. 6 and 7, includes a plurality of poles 55 and a further conductor 50. The poles 55 are made of the same material as the poles 21. The poles 55 are arranged in a pattern similar to the poles 21. The conductor 50 is made of the same material as the conductor 20. The conductor 50 has two ends which are electrically coupled to the control circuit 12, as illustrated diagrammatically in FIG. 1 by respective broken lines 28 and 30. As illustrated by FIG. 7, the conductor 50 is routed around the poles 55 in the same way that, as described above, the conductor 20 is routed around the poles 21. The poles 55 respond to a forward current flow and a reverse current flow through the conductor 50 in the same fashion as the poles 21, although in the disclosed embodiment the current through the conductor 50 normally flows in only one direction during normal operation.

Figure 8:
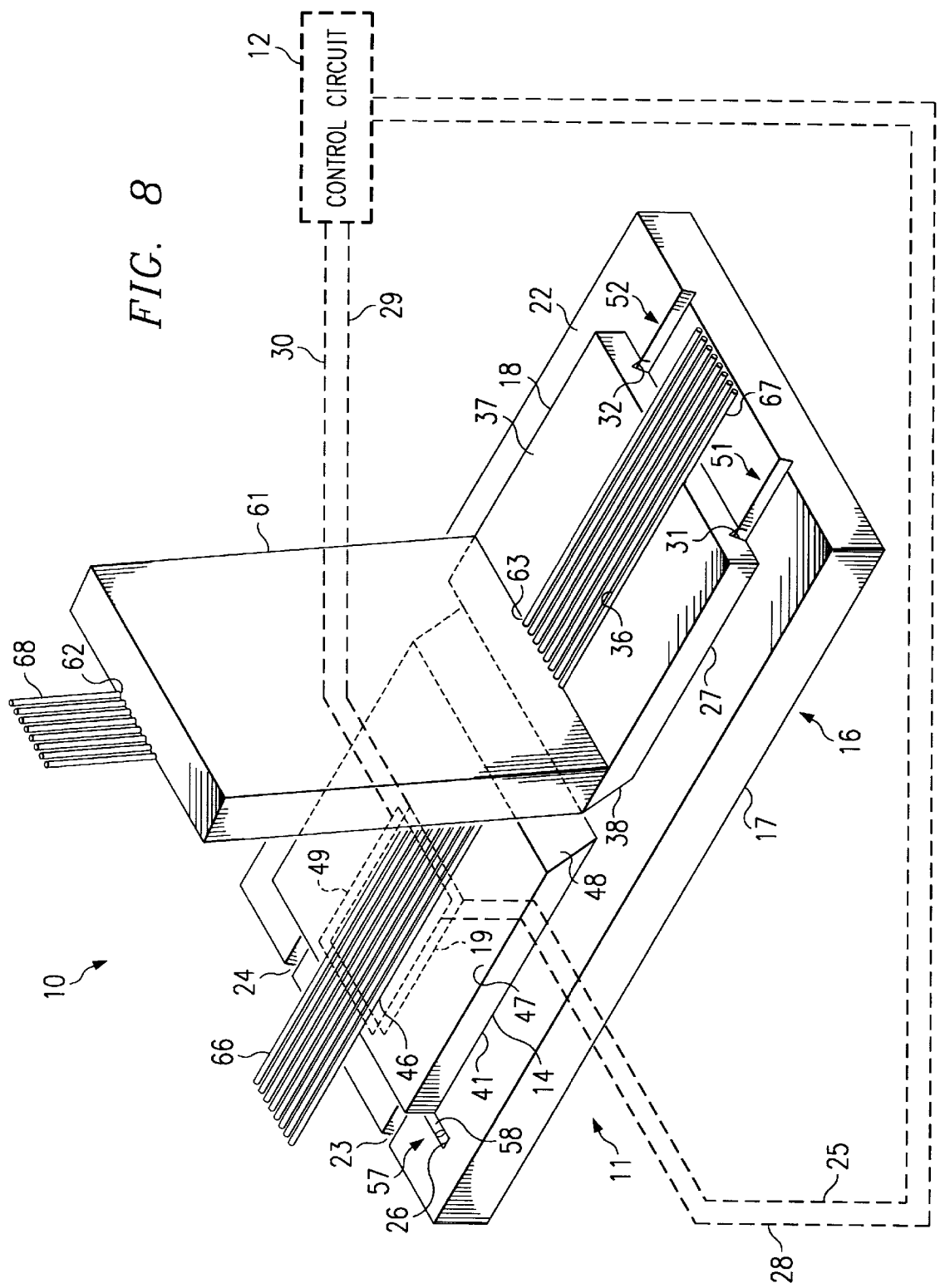
FIG. 8 is a diagrammatic perspective view similar to FIG. 1, but showing the optical switch with the sliding piece thereof in a different operational position, which is the same operational position shown in FIG. 6.

The sliding piece 14 is positioned adjacent to the base 17 for movement between the advanced position shown in FIGS. 1 and 2, and a retracted position shown in FIGS. 6 and 8. In the advanced position shown in FIG. 2, the poles 21 are only partially aligned with the poles 55. The partial alignment of the poles 21 and the poles 55 is characterized by an overlap of approximately 25% in the direction of movement of the sliding piece, as shown by reference numeral 56 in FIGS. 2 and 6. The overlap of 25% represents the amount of overlap with reference to the width dimension of an individual pole in the direction of movement. Alternatively, this alignment could be any other suitable degree of partial alignment. In order to realize the desired degree of overlap when the sliding piece is in its advanced position, the fixed piece 18 is appropriately positioned with respect to the base 17 before being bonded to the base 17, so as to effect this amount of alignment between the poles of the two generators 19 and 49 when the beveled ends 38 and 48 are engaging each other. Once this position of the fixed piece 18 has been set, the fixed piece is then bonded to the base 17.

When the sliding piece 14 is in the advanced position, as illustrated by FIG. 2, the poles 21 and 55 of the generators 19 and 49 are producing magnetic fields in a manner so that, given the attraction forces of north and south poles, and the repulsion forces of north poles to north poles and south poles to south poles, the sliding piece 14 is urged toward the fixed piece 18. The 25% overlap 56 occurs when the sliding piece 14 is fully in the advanced position, and ensures that the sliding piece 14 moves away from this position in the proper direction, as discussed below.

In order to move the sliding piece 14 to its retracted position, the direction of current flow through the conductor 20 is reversed, which in turn reverses the magnetic fields produced by each of the poles 21, as evident from a comparison of FIGS. 2 and 6. Consequently, each pole 55 will now be attracted by poles 21 which had been repelling it, and will be repelled by poles 21 which had been attracting it. This will cause the sliding piece 14 to move from its advanced position to its retracted position. Due to the fact that each pole 55 has only a 25% overlap 56 with the nearest pole 21, and the fact that these partially overlapping poles will now be repelling each other, the repulsion force will tend to have a horizontal component which urges the sliding member 14 toward its retracted position, rather than in the opposite direction. This ensures that the sliding member will not inadvertently try to move in the wrong direction and thus become effectively locked in its advanced position.

The amount of movement of the sliding piece 14 from its advanced position to its retracted position is such that each pole 55 will move from a position in which it has a 25% overlap with one pole 21 (FIG. 2) to a position in which it has a 25% overlap 59 with the next adjacent pole 21 (FIG. 6). This amount of movement is less than the center-to-center spacing between adjacent poles. The 25% overlap 59 occurs when the sliding piece 14 is in its fully retracted position, and ensures that the sliding piece 14 moves away from this position in the proper direction, for reasons similar to those just described for movement away from the advanced position. In order to achieve both the 25% overlap 56 and the 25% overlap 59 in the respective positions of the sliding piece 14, the size of and spacing between the poles in each row of both generators must be appropriately selected to have a specific relationship to the amount of movement of the sliding piece 14 between its operational positions.

Due to the fact that there is both attraction and repulsion between the generators 19 and 49 at any given point in time during normal operation, there is a net cancellation of vertical forces exerted on the sliding piece 14 by the interacting magnetic fields. It will be recognized that, in a sense, the generators 19 and 49 may be viewed as the armature and stator of a linear DC motor.

Once the sliding piece 14 has been moved from either of its advanced and retracted positions to the other thereof, the amount of current flowing through each of the two conductors 20 and 50 can be reduced to a "standby" level. The magnitude of the standby current is less than the current magnitude needed to reliably effect movement of the sliding piece 14, but is sufficient to reliably maintain the sliding piece in either of its advanced and retracted positions once it has been moved to that position through use of a higher magnitude current. Thus, each time the direction of the current flow through the conductor 20 is reversed, the magnitudes of the currents through both of the conductors 20 and 50 are increased for a brief time interval sufficient for the sliding piece 14 to move from one position to the other, and then are both decreased back to the standby level. The use of the standby currents is optional, but has the advantage of conserving power.

An even lower standby current, or no standby current, could be realized by providing a not-illustrated bistable spring to cooperate with the sliding piece 14. Alternatively, instead of the bistable spring, a reduced standby current could be used in association with at least one not-illustrated low reluctance keeper provided on the sliding piece 14. Each such keeper would be a region of ferromagnetic film which interacts with the magnetic fields produced by the generator 19 (or by some other magnetic source such as another similar generator or a permanent magnet), so as to generate a downward force on the sliding piece 14 which enhances static friction between the sliding piece 14 and the fibers 53–54 and/or the base 17. This force tends to maintain the sliding part 14 in proximity to the base 17, and the added friction contributes to the stability of the optical switch 11.

As discussed above, the current supplied to the generator 49 in the disclosed embodiment is a continuous current which does not change direction during normal operation. Consequently, it will be recognized that it would alternatively be possible to replace the generator 49 with an array of permanent magnets arranged to provide a configuration of north and south poles comparable to that shown in FIG. 7, but without the conductor 50 of FIG. 7. Moreover, if the permanent magnets produced sufficiently strong magnetic fields, they would be effective to hold the sliding piece 14 in either of its advanced and retracted positions, without any need for a standby current in the conductor 20 of the other magnetic field generator 19. In that case, current would be supplied to the conductor 20 of generator 19 only when there was a need to effect movement of the sliding piece 14 from one of its advanced and retracted positions to the other thereof.

Referring back to FIG. 1, the optical switch 11 includes a set of guide arrangements 51 and 52. The guide arrangements 51 and 52 serve to facilitate the aligned sliding movement of the sliding piece 14 relative to the base 17 and fixed piece 18 between its advanced and retracted positions, which are respectively shown in FIGS. 1 and 8. The guide arrangements 51 and 52 include the parallel grooves 23 and 24 in the base 17, the parallel grooves 42 and 43 in the sliding piece 14, and a pair of optical fibers 53 and 54. The optical fibers 53 and 54 are disposed partially in the grooves 23 and 24, and partially in the grooves 31, 32, 42, and 43. Although the disclosed embodiment uses optical fibers for the elements 53 and 54, these elements could alternatively be any other elongate elements which would facilitate sliding movement of the sliding piece 14 relative to the base 17 and fixed piece 18.

As shown in FIG. 1, a stop 57 is provided on the base 17. The stop 57 includes the groove 26, and includes an optical fiber 58 disposed partly in the groove 26. The fiber 58 has an upper portion disposed higher than the top surface 22 of the base 17. As illustrated in FIG. 8, the sliding piece 14 engages the fiber 58 of the stop 57 to thus prevent sliding movement of the sliding piece 14 beyond its retracted position. Movement of the sliding piece 14 to its advanced position is limited by engagement of the beveled end 48 of the sliding piece 14 with the beveled end 38 of the fixed piece 18, as shown in FIG. 1.

The optical switch 11 also includes a vertical piece 61, which is perpendicular to the fixed piece 18. The vertical piece 61 is fixedly secured to and supported by the fixed piece 18, but the vertical piece 61 could alternatively be integral with the fixed piece 18. The vertical piece 61 is made of a silicon semiconductor material. It should be understood that, while the base 17, the fixed piece 18, the sliding piece 14, and the vertical piece 61 are made of a silicon semiconductor material in this embodiment, these pieces could alternatively be made of germanium or gallium arsenide semiconductor material, or any other semiconductor or non-conducting material. Eight parallel V-shaped grooves 62 are provided in a side surface of the vertical piece 61. FIG. 4 shows that the vertical piece 61 also includes, in a bottom surface, eight parallel V-shaped grooves 63 that are aligned with the grooves 36 in the fixed piece 18.

FIGS. 1 and 5 further show that sliding piece 14 supports end portions of eight optical fibers 66 in the parallel grooves 46. In addition, as shown in FIGS. 1 and 4, the fixed piece 18 supports end portions of eight optical fibers 67 in the parallel grooves 36. The fibers 67 are also disposed partially in the grooves 63. The vertical piece 61 supports end portions of eight optical fibers 68 in the parallel grooves 62, as shown in FIG. 1. The optical fibers 66, 67, and 68 are optical fibers of a standard type known in the industry. The optical fibers 66, 67, and 68 are bonded, using a suitable known adhesive, to the sliding piece 14, the fixed piece 18, and the vertical piece 61, respectively. The optical fibers 66 and 67 include beveled ends 72 and 73. The beveled ends 72 and 73 are polished and cut at an angle which is the same as the angles of the surfaces 38 and 48. The beveled ends 72 and 73 are parallel to and flush with the respective beveled end surfaces 38 and 48. The optical fibers 66, 67, and 68 will now be discussed in more detail in association with FIGS. 2 and 6.

FIG. 2 shows a set of three optical fibers which includes one of the optical fibers 66, one of the optical fibers 67, and one of the optical fibers 68, when the sliding piece 14 is in its advanced position. These optical fibers 66, 67, and 68 each include a respective cladding 76, 77, and 78 which concentrically surrounds a respective core 81, 82, and 83. The claddings 76, 77, and 78 each have an index of refraction which is lower than the index of refraction of the associated cores 81, 82, and 83.

As illustrated in FIG. 2, the beveled end 72 of the fiber 66 is adjacent to or in contact with the beveled end 73 of the associated fiber 67 when the sliding piece 14 is in its advanced position. The optical radiation traveling along a portion 87, designated by a broken line, of an optical path in the fiber 67 passes through the beveled end surfaces 72–73 and continues propagating through the fiber 66 along a further portion 88 of that optical path, which is also designated by a broken line. Internal reflection does not occur at the interface between the beveled ends 72 and 73 in the advanced position of the sliding piece 14 as illustrated in FIG. 2, because the index of refraction of the core 81 of the optical fiber 66 is selected to be equal to the index of refraction of the core 82 of the optical fiber 67.

FIG. 6 is similar to FIG. 2, but shows the set of optical fibers 66, 67, and 68 when the sliding piece 14 is in the retracted position. In the retracted position of the sliding piece 14, the beveled ends 72 of the optical fibers 66 are parallel to and spaced apart from the beveled ends 73 of the optical fibers 67. The spacing of the beveled ends 72 and 73 should be at least 3 μm in order to effect total internal reflection of optical signals (in a manner discussed below), and in the disclosed embodiment this spacing is about 5 μm.

Figure 9:
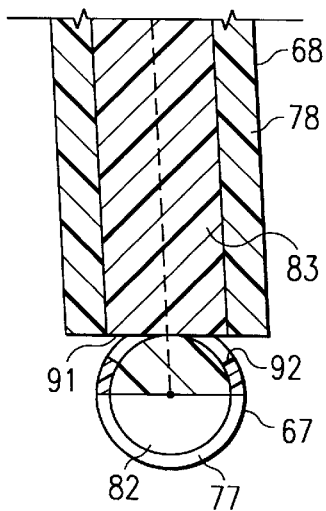
FIG. 9 is a diagrammatic fragmentary sectional view showing portions of two optical fibers which are components of the optical switch of FIG. 1.

As shown in FIG. 6, a portion 87 of a path for optical radiation, shown as a broken line, extends through the optical fiber 67 to the beveled end 73, where the optical radiation is totally internally reflected when the sliding piece 14 is in its retracted position. After total internal reflection, the radiation travels upwardly along a further portion of the optical path which extends through the fiber 68, and which is designated by reference numeral 89. Total internal reflection is effected at the beveled end 73 because the index of refraction of the air gap between the sliding piece 14 and the fixed piece 18 is less than the index of refraction of the core 82 of the optical fibers 67, and because radiation impinges on the beveled end at an angle that is greater than a critical angle with respect to a line normal to the plane of the beveled end. As shown in FIG. 9, the optical fibers 68 supported by the vertical piece 61 each have their end surface 91 adjacent to the top side of the core 82 of the associated fiber 67 supported by the fixed piece 18. In this regard, a portion of the cladding at the end of the fiber 67 on the top side thereof has been removed in order to create a window 92 which receives the end of the vertical fiber 68. The axes of the cores 83 and 82 of the optical fibers 68 and 67 intersect in the center of the beveled end surface 73 of the fiber 67.

Figure 10:
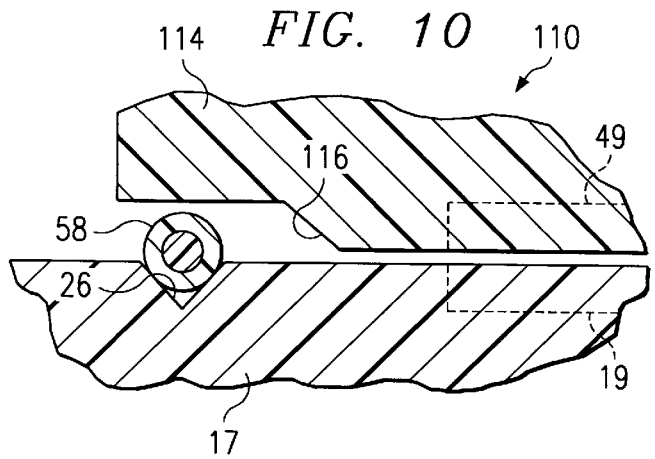
FIG. 10 is a diagrammatic fragmentary side view of part of an optical switch which is an alternative embodiment of the optical switch shown in FIG. 1.

FIG. 10 is a diagrammatic fragmentary side view of part of an optical switch 110 which is an alternative embodiment of the optical switch 11 shown in FIG. 1. The optical switch 110 of FIG. 10 is identical to the optical switch 11 of FIG. 1, except that the sliding piece 114 of FIG. 10 is different from the sliding piece 14 of FIG. 1. In this regard, the groove 26 in the base 17 can be formed by etching steps during the same semiconductor processing techniques which are used to create the magnetic field generator 19. Consequently, the groove 26 and the fiber 58 disposed in it serve as a reliable reference with respect to the generator 19. But to ensure that the two magnetic field generators 19 and 49 have the desired alignment (25% overlap of poles) when the sliding piece is in its retracted position, a comparable reference can be formed on the sliding piece 114 while the magnetic field generator 49 is being fabricated. In particular, the sliding piece 114 has a recess or notch 116 etched at the end of the underside thereof during the processing steps which also form the magnetic field generator 49, such the inner end of the recess 116 engages the fiber 58 when the sliding piece 114 is in its retracted position, thereby ensuring that the poles of the magnetic field generators 19 and 49 have the proper alignment or overlap with respect to each other. Instead of etching the entire notch 116, a groove or line could be patterned in the bottom surface of the sliding piece during formation of the generator 49, and then the back edge of the sliding piece could be polished back to this groove or line. This latter technique is how the slider 14 of FIG. 1 would be formed.

A description will now be provided of the operation of the optical switch 11 of FIGS. 1–9. As shown in FIGS. 1, 2, 6, and 8, and as discussed above, the sliding piece 14 moves between its advanced and retracted positions. This movement is controlled by the control circuit 12 (FIGS. 1 and 8). In the disclosed embodiment, the control circuit maintains a constant current in the same direction through the conductor 50 at all times during normal operation. In order to effect movement of the sliding piece 14 toward one of its advanced and retracted positions, the control circuit 12 causes current to flow in a selected one of a forward direction and a reverse direction through the conductor 20. Although the disclosed embodiment uses a constant current flow in the same direction through the conductor 50 while selectively varying the direction of current flow through the conductor 20, it would alternatively be possible to use a constant current flow in the same direction through the conductor 20 while selectively varying the direction of current flow through the conductor 50. A further alternative would be to reverse the two current flows in an alternating manner, in particular by reversing the current flow through conductor 20 and not conductor 50, later reversing the current flow through conductor 50 and not conductor 20, and so forth.

With respect to the generator 19 in the base 17, assume that the current flows in a forward direction through the electrical connections 25 and 29 and the conductor 20. The poles 21 each respond to the current flow by generating a magnetic field having either a north polarity or a south polarity, as discussed above. Thus for example, as illustrated in FIG. 3, the poles 21 in rows 21A, 21C, and 21E would each generate a magnetic field having a south polarity, and the poles 21 in rows 21B and 21D would each generate a magnetic field having a north polarity. When the direction of current flow through the conductor 20 is, reversed, each of the poles 21 reverses the polarity of the magnetic field it is generating. Thus for example, in the embodiment illustrated by FIG. 3, the poles 21 in rows 21A, 21C, and 21E would each respond to a current flow in the reverse direction by generating a magnetic field having a north polarity, and the poles 21 in rows 21B and 21D would each generate a magnetic field having a south polarity.

FIG. 2 illustrates the sliding piece 14 in its advanced position. When sliding piece 14 is in the advanced position the poles 21 each overlap the nearest pole 55 by 25%, as discussed above. As also discussed above, the attraction forces of north and south poles, combined with the repulsion forces of north poles to north poles and south poles to south poles, urges the sliding piece toward the fixed piece 18 such that the beveled ends 38 and 48 engage, and such that the beveled ends 73 and 72 are adjacent or in contact. The limited overlap ensures that, when the sliding piece 14 is later to move to its retracted position, it will move away from its advanced position in the proper direction, as discussed above.

When the sliding piece 14 is in the advanced position, the optical radiation traveling along the portion 87 of the optical path in the fiber 67 passes through the beveled end surfaces 72–73 and continues propagating through the fiber 66 along the further portion 88 of that optical path. Internal reflection does not occur at the interface between the beveled ends 72 and 73 in the advanced position of the sliding piece 14, because the index of refraction of the core 81 of the optical fiber 66 is equal to the index of refraction of the core 82 of the optical fiber 67.

When the current through the conductor 20 is reversed by the control circuit 12, the poles 21 each reverse their respective magnetic fields. In the manner discussed above, this causes the sliding piece 14 to move to its retracted position of FIG. 6. As the sliding piece 14 moves away from the fixed piece 18, the beveled ends 72 and 73 separate, until movement stops when the sliding piece 14 engages the stop 57.

When the sliding piece 14 is in the retracted position of FIG. 6, and as discussed above, the poles 21 are each only partially aligned with the nearest pole 55, in that there is a 25% overlap 59. This limited overlap ensures that, when the sliding piece 14 is later to move back to its advanced position, it will move away from its retracted position in the proper direction, as discussed above.

As shown in FIG. 6, the portion 87 of the path for optical radiation extends through the optical fiber 67 to the beveled end 73, where the optical radiation is totally internally reflected when the sliding piece 14 is in its retracted position. After total internal reflection, the optical radiation travels along a further portion 89 of the optical path which extends through the fiber 68. Total internal reflection is effected at the beveled end 73 because the index of refraction of the air gap between the sliding piece and the fixed piece 18 is less than the index of refraction of the core 82 of the optical fiber 67, and because the radiation impinges on the beveled end 73 at an angle that is greater than a critical angle with respect to a line normal to the plane of the beveled end 73. By switching the sliding piece 14 between its advanced and retracted positions, optical radiation can either be transmitted without reflection through the optical fibers 67 and 66 (when the sliding piece 14 is in the advanced position), or transmitted through the fiber 67 and then through the fiber 68 after total internal reflection at the beveled end 73 (when the sliding piece 14 is in the retracted position).

The embodiment of FIG. 10 operates in a manner similar to that described above for the embodiment of FIG. 1. Accordingly, a detailed explanation of the operation of the embodiment of FIG. 10 is not provided here.

The present invention provides a number of technical advantages. One such technical advantage is that the actuation of the optical switch is indirect, which avoids mechanical constraints of the type involved in arrangements such as piezoelectric actuators, where the actuator is directly coupled to the part being switched. In this regard, the present invention is advantageous in situations involving highly miniaturized switches, where arrangements such as piezoelectric actuators are disadvantageous or even impractical. Further advantages are that the switch is compact, and provides high isolation and low attenuation.

Another advantage of the present invention is low power consumption. The control circuit requires very little power to implement the necessary current flow through the generators in order to reliably move the sliding piece.

Still another advantage of the present invention is that the magnetic field generators are monolithically integrated into the base and sliding part. This allows for progressive miniaturization of the system, which increases its overall versatility and potential applications.

Although selected embodiments have been illustrated and described in detail, it will be understood that various substitutions and alterations can be made therein without departing from the spirit and scope of the present invention, as defined by the following claims.

What is claimed is:

1. An apparatus comprising:

a first member having a first generator that includes a first pole which can generate a magnetic field;

a second member having a second generator that is adjacent said first generator and that includes a second pole which can generate a magnetic field, said first member being supported for movement relative to said second member between first and second positions, wherein one of said first and second generators includes a polarity control conductor extending adjacent one of said first and second poles therein and the other of said poles in the other of said generators effects generation of a magnetic field of predetermined polarity, wherein when a current is passed in a first direction through said polarity control conductor said one pole generates a first magnetic field such that the interaction between magnetic fields generated by said first and second poles causes said first member to be urged toward said first position, and when a current is passed through said polarity control conductor in a second direction opposite said first direction said one pole generates a second magnetic field with a polarity opposite to said first magnetic field and the interaction between the magnetic fields generated by said first and second poles causes said first member to be urged toward said second position; and first and second optical elements, said first optical element being coupled to said first member and said second optical element be coupled to said second member, wherein movement of said first member relative to said second member between said first and second positions effects movement of said first optical element relative to said second optical element respectively between first and second positions, and wherein when said first optical element is respectively in said first and second positions thereof an optical path is respectively established and interrupted, said first and second optical elements each influencing radiation traveling along said optical path when said first and second optical elements are in said first position thereof.

2. An apparatus according to claim 1, wherein said other generator includes a further conductor extending adjacent said other pole, and wherein when a current is passed through said further conductor in a predetermined direction said other pole generates the magnetic field of predetermined polarity.

3. An apparatus according to claim 2, wherein said first generator includes a first plurality of poles which are arranged adjacent said conductor therein so that successive said poles thereof in a direction parallel to a direction of movement of said first member produce magnetic fields of opposite polarity in response to a current flow through said conductor therein, said first pole being one of said poles in said first plurality of poles; and wherein said second generator includes a second plurality of poles which are arranged adjacent said conductor therein so that successive said poles thereof in a direction parallel to the direction of movement of said first member produce magnetic fields of opposite polarity in response to a current flow through said conductor therein, said second pole being one of said poles in said second plurality of poles.

4. An apparatus according to claim 1, wherein said first generator includes a first plurality of poles which are arranged so that successive said poles thereof in a direction parallel to a direction of movement of said first member produce magnetic fields of opposite polarity, said first pole being one of said poles in said first plurality of poles;

wherein said second generator includes a second plurality of poles which are arranged so that successive said poles thereof in a direction parallel to the direction of movement of said first member produce magnetic fields of opposite polarity, said second pole being one of said poles in said second plurality of poles;

wherein said one generator has said plurality of poles thereof arranged adjacent said conductor therein so that successive said poles thereof in a direction parallel to a direction of movement of said first member produce said magnetic fields of opposite polarity in response to a current flow through said conductor therein; and wherein when said first member is respectively in said first and second positions thereof, each of said poles of said first generator is in partial alignment with a respective one of two adjacent poles of said second generator.

5. An apparatus according to claim 4, wherein said conductor is routed so as to make half turns in alternating directions around successive said poles adjacent thereto, thereby facilitating the generation by said poles of the magnetic fields of alternating polarity.

6. An apparatus according to claim 5, wherein each said generator includes a core member made of a ferromagnetic material and having a plurality of portions which serve as said plurality of poles thereof, and wherein said one of said generators has said polarity control conductor thereof provided on said core member thereof between said portions of said core member.

7. An apparatus according to claim 1, wherein said movement of said first member is guided by a plurality of guides, and wherein movement of said first optical element relative to said second optical element occurs in a direction substantially parallel to the direction of movement of said first member.

8. An apparatus according to claim 7, wherein each said guide includes aligned grooves provided respectively in said first and second members, and includes an additional optical fiber disposed in said aligned grooves.

9. An apparatus according to claim 8, wherein said second member includes a stop, said stop including a groove provided in said second member and a further optical fiber disposed partially in said groove of said stop, wherein when said first member is in said second position said first member engages said further optical fiber in response to the interaction between the magnetic fields generated by said poles of said first and second generators, and wherein when said first member is in said first position said first optical element engages said second optical element in response to said interaction between the magnetic fields generated by said poles of said first and second generators.

10. An apparatus according to claim 1, further comprising a third optical element supported on said second member adjacent to said second optical element and fixed against movement relative to said second optical element, wherein when said first member is respectively in said second and first positions thereof a further optical path is respectively established and interrupted, said second and third optical elements each influencing optical radiation traveling along said further path.

11. An apparatus according to claim 10, wherein said first and second members each include a semiconductor material.

12. An apparatus according to claim 10, wherein said first and second optical elements are optical fibers having beveled end surfaces, said beveled end surfaces moving out of and into engagement to respectively permit and prevent internal reflection of optical radiation traveling through said second optical element by said end surface of said second optical element when said first member is respectively in said second and first positions, such that optical radiation traveling through said second optical element passes through said beveled end surfaces and into said first optical element in response to the absence of said internal reflection, and is reflected into said third optical element in response to the occurrence of said internal reflection.

13. A method comprising the steps of:
supporting first and second members for relative movement adjacent each other between first and second positions;
configuring said first member to have a first generator that includes a first pole which can generate a magnetic field;
configuring said second member to have a second generator that is adjacent said first generator and that includes a second pole which can generate a magnetic field;
providing in one of said first and second generators a polarity control conductor which extends adjacent one of said first and second poles disposed therein;
using the other of said poles in the other of said generators to effect generation of a magnetic field of predetermined polarity;
passing a current through said polarity control conductor in a selected one of first and second directions which are opposite, current flow in said first direction through said polarity control conductor causing said one pole to generate a first magnetic field in a manner so that the interaction between magnetic fields generated by said first and second poles causes said first member to be urged toward said first position, and current flow in said second direction through said polarity control conductor causing said one pole to generate a second magnetic field with a polarity opposite to said first magnetic field in a manner so that the interaction between the magnetic fields generated by said first and second poles causes said first member to be urged toward said second position;
supporting a first optical element on said first member and a second optical element on said second member, movement of said first member relative to said second member between said first and second positions effecting movement of said first optical element relative to said second optical element respectively between first and second positions, wherein when said first optical element is respectively in said first and second positions thereof an optical path is respectively established and interrupted, said first and second optical elements each influencing radiation traveling along said optical path when said first and second optical elements are in said first position thereof.

14. A method according to claim 13, including the step of configuring said other generator to include a further conductor extending adjacent said other pole, and including the step of passing a current through said further conductor in a predetermined direction so that said other pole generates said magnetic field of predetermined polarity.

15. A method according to claim 14, including the steps of:
configuring said first generator to have a first plurality of poles which are arranged adjacent said conductor therein so that successive said poles thereof in a direction parallel to a direction of movement of said first member produce magnetic fields of opposite polarity in response to a current flow through said conductor therein, said first pole being one of said poles in said first plurality of poles; and
configuring said second generator to have a second plurality of poles which are arranged adjacent said conductor therein so that successive said poles thereof in a direction parallel to the direction of movement of said first member produce magnetic fields of opposite polarity in response to a current flow through said conductor therein, said second pole being one of said poles in said second plurality of poles.

16. A method according to claim 13, including the steps of:
configuring said first generator to have a first plurality of poles which are arranged so that successive said poles thereof in a direction parallel to a direction of movement of said first member produce magnetic fields of opposite polarity, said first pole being one of said poles in said first plurality of poles;
configuring said second generator to have a second plurality of poles which are arranged so that successive said poles thereof in a direction parallel to the direction of movement of said first member produce magnetic fields of opposite polarity, said second pole being one of said poles in said second plurality of poles;
arranging said poles of said one generator adjacent said conductor therein so that successive said poles thereof in a direction parallel to a direction of movement of said first member produce said magnetic fields of opposite polarity in response to a current flow through said conductor; and
causing each of said poles of said first generator to be in partial alignment with a respective one of two adjacent poles of said second generator when said first member is respectively in said first and second positions thereof.

17. A method according to claim 16, including the step of routing said conductor so as to make half turns in alternating directions around successive said poles adjacent thereto, thereby facilitating the generation by said poles of the magnetic fields of alternating polarity.

18. A method according to claim 16, including the steps of configuring each said generator to include a core member made of a ferromagnetic material and having a plurality of portions which serve as said plurality of poles thereof, and providing said conductor of said one generator on said core member thereof between said portions of said core member.

19. A method according to claim 13, including the step of providing a third optical element on said second member adjacent to and fixed against movement relative to said second optical element, wherein when said first member is respectively in said second and first positions thereof a further optical path is respectively established and interrupted, said second and third optical elements each influencing optical radiation traveling along said further path.

* * * * *